(12) United States Patent
Maksumov et al.

(10) Patent No.: US 9,998,566 B2
(45) Date of Patent: Jun. 12, 2018

(54) INTELLIGENT GATEWAY WITH A COMMON DATA FORMAT

(71) Applicant: General Electric Company, Schenectady, NY (US)

(72) Inventors: Alisher Maksumov, Pleasanton, CA (US); Li Zhang, Clifton Park, NY (US); Adam Joseph McCann, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 559 days.

(21) Appl. No.: 14/531,799

(22) Filed: Nov. 3, 2014

(65) Prior Publication Data

US 2016/0127514 A1 May 5, 2016

(51) Int. Cl.
| | |
|---|---|
| *H04L 29/06* | (2006.01) |
| *H04L 29/08* | (2006.01) |
| *H04L 12/24* | (2006.01) |
| *H04W 4/00* | (2018.01) |

(52) U.S. Cl.
CPC .......... *H04L 69/08* (2013.01); *H04L 41/0226* (2013.01); *H04L 65/1033* (2013.01); *H04L 67/10* (2013.01); *H04W 4/003* (2013.01); *H04W 4/60* (2018.02)

(58) Field of Classification Search
CPC ..... H04L 69/08; H04L 41/0226; H04L 67/10; H04L 65/1033; H04W 4/003
See application file for complete search history.

(56) References Cited

U.S. PATENT DOCUMENTS

| | | | | |
|---|---|---|---|---|
| 8,676,123 | B1* | 3/2014 | Hinkle | H04M 1/274508 455/41.2 |
| 2006/0288297 | A1* | 12/2006 | Haitani | G06F 1/1632 715/739 |
| 2008/0119201 | A1* | 5/2008 | Kolber | H04W 8/18 455/456.1 |
| 2010/0178953 | A1* | 7/2010 | Blewett | H04L 51/38 455/550.1 |
| 2011/0131338 | A1* | 6/2011 | Hu | H04W 76/02 709/229 |
| 2011/0161343 | A1* | 6/2011 | Schimpf | G06F 17/30398 707/769 |

(Continued)

*Primary Examiner* — Uzma Alam
(74) *Attorney, Agent, or Firm* — Fitch Even Tabin & Flannery LLP

(57) ABSTRACT

Example embodiments of a method, apparatus, and computer readable medium for a gateway with common data format are generally described herein. The gateway may include memory to store data in a common data format to be operated on by applications, and network interfaces configured to interface an application to a remote device via a network. The gateway may further include protocol adapters configured to communicate with the remote device using a communication protocol of the remote device, and data adapters configured to convert data between a format of the remote device and the common data format. The gateway may further include a protocol selector module configured to select a protocol adapter where a selected protocol adapter communicates with a remote device, and a data adapter selector module configured to select a data adapter where a selected data adapter adapts data between the remote device and the common format.

15 Claims, 13 Drawing Sheets

(56) References Cited

U.S. PATENT DOCUMENTS

| | | | |
|---|---|---|---|
| 2013/0246449 A1* | 9/2013 | Balannik | G06F 17/30345 707/758 |
| 2014/0181277 A1* | 6/2014 | Burns | G06F 9/541 709/221 |
| 2014/0222793 A1* | 8/2014 | Sadkin | G06F 17/3053 707/723 |
| 2015/0038233 A1* | 2/2015 | Rom | A63F 13/42 463/42 |
| 2015/0120841 A1* | 4/2015 | Maria | H04L 65/1016 709/206 |

* cited by examiner

INTELLIGENT GATEWAY WITH A COMMON DATA FORMAT

TECHNICAL FIELD

The subject matter disclosed herein relates to a gateway that supports applications and, more particularly, to a gateway with a common data format.

BACKGROUND

Many systems use different data formats and protocols. Often, applications need to process data and use services from different devices or domains. However, it may be difficult to develop applications fir the different devices because of the different protocols and data formats used by the different devices. Moreover, more and more data is being generated that is processed at central servers, but moving the data to the central servers often introduces delays and requires the use of a bandwidth to move the data to central servers.

BRIEF DESCRIPTION OF THE DRAWINGS

The present disclosure is illustrated by way of example, and not limitation, in the figures of the accompanying drawings, in which like references indicate the same or similar elements and in which.

DETAILED DESCRIPTION

The following description and the drawings sufficiently illustrate specific example embodiments to enable those skilled in the art to practice them. Other example embodiments may incorporate structural, logical, electrical, process, and other changes. Portions and features of some example embodiments may be included in, or substituted for, those of other example embodiments.

Figure 1:
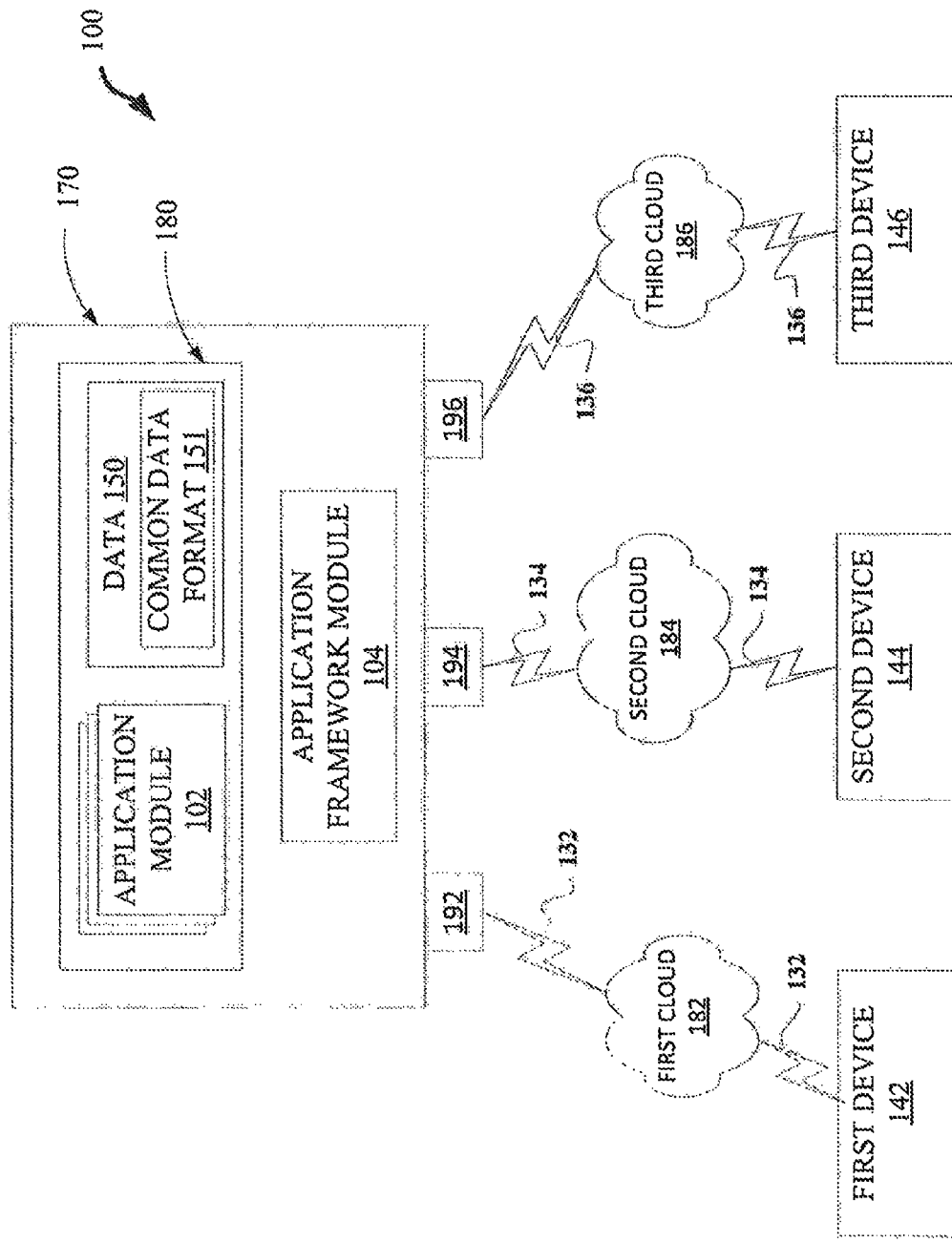
FIG. 1 illustrates a system, in accordance with an example embodiment, including a gateway with data in a common data format.

FIG. 1 illustrates a system 100, in accordance with an example embodiment, including a gateway 170 with data 150 in a common data format 151. The system 100 is also shown to include a plurality of devices (e.g., a first device 142, a second device 144 and a third device 146) that may communicate using different data formats and different communication protocols with the gateway 170. For example, the first device 142 may be a mobile device, the second device 144 may be an embedded controller in an industrial machine, and each device may use a proprietary data format and communication protocol. The gateway 170 may be an edge device on a network.

The gateway 170 is shown to further include one or more application module(s) 102 that operatively access the data 150 in the common data format 151 (e.g., XML). In the example system 100, communications (e.g., a first communication 132, a second communication 134, and a third communication 136) are shown between the gateway 170 and the devices 142, 144, and 146 via cloud networks (e.g., first, second and third cloud networks 182, 184, and 186). It should, however, be noted that the communications 132, 134 and 136 may be via other networks or any combination of networks (e.g., cloud-based or otherwise). To this end, a plurality of network interfaces (e.g., network interfaces 192, 194, and 196) is provided to interface the gateway 170 to the cloud networks 182, 184, and 186.

Figure 3:
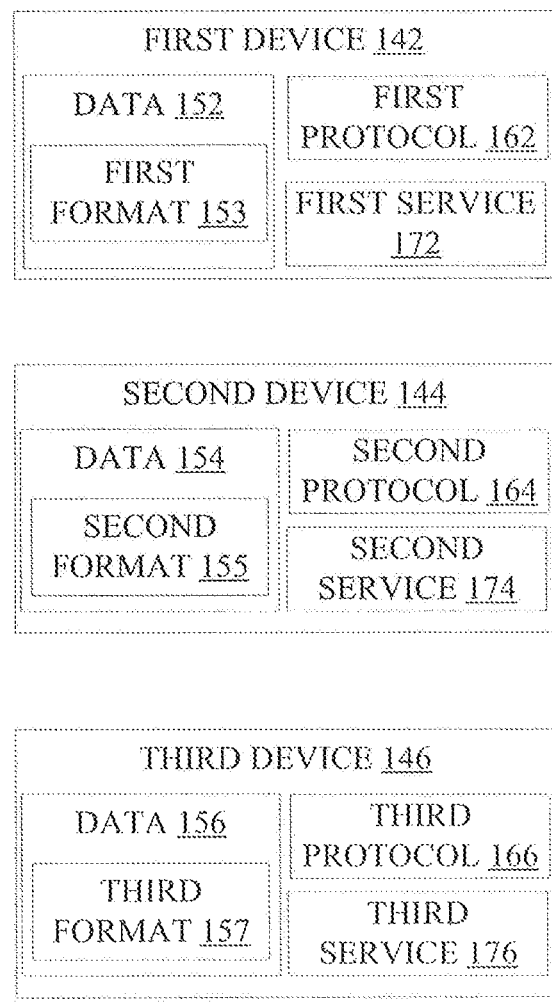
FIG. 3 illustrates examples of a first device, a second device, and a third device forming part of the system of FIG. 1.

The gateway 170 is configured to facilitate communications (e.g., see communications 132, 134, and 136) between devices 142, 144, and 146 and the gateway 170 using different data protocols and data formats (e.g., see FIG. 3). To this end, the gateway 170 communicates with the first device 142, the second device 134, and the third device 136 and converts data 152, 154, and 156 (see FIG. 3) from the first device 142, the second device 144, and the third device 146, respectively into the common data format 151. Accordingly, the application module(s) 102 can process the data 152, 154 and 156 in the common data format 151. The data 152 on the first device 142 is shown to be in a first format 153, the data 154 on the second device 144 is shown to be in a second format 155, and the data 156 on the third device 146 is shown to be in a third format 157. Thus, although data residing on remote devices may be in a different data format, and communications may use different communications protocols, a single application module 102 can be used to process the data 152, 154, 156 following conversion of the data 152, 154, 156 to the common data format 151.

A common data format area 180 provides an environment for the application module(s) 102 to operate on the data 150 in the common data format 151. The data in the common data format area 180 is operatively received from the devices 142, 144, and 146 and converted to the common data format 151. When the data from the common data format area 180 is sent to the devices 142, 144, and 146, it is converted into a data format suitable for the respective device to which it is to be sent. For example, referring to FIGS. 1 and 3, the gateway 170 is configured to send data to the first device 142 in the first format 153 using a first protocol 162, send data to the second device 144 in the second format 155 using a second protocol 164, and so on. Likewise, the gateway 170 is configured to receive data from the first device 142 in the first format 153 using the first protocol 162, receive data from the second device 144 in the second format 155 using the second protocol 164, and so on. Using the common data format 151 thus allows the application module(s) 102 to be simplified in that they only need to be configured to accommodate a single data format instead of multiple data formats if they were to communicate directly with the devices 142, 144, and 146.

In an example embodiment, the first device 142, the second device 144, and the third device 146 may be devices that generate or consume data 152, 154, 156 (see FIG. 3) and provide services (e.g., a first service 172, a second service 174, and a third service 175). In example embodiments, the first device 142, the second device 144, and the third device 146 can define data domains.

In other example embodiments, one or more of the devices 142, 144, and 146 include devices/components that form part of industrial machines. For example, one or more of the devices 142, 144, and 146 may include components to monitor and/or control industrial machines, components that include sensors to sense operating parameters of machines, or the like. As mentioned above, in other example embodiments, one or more of the devices 142, 144, and 146 include mobile devices, or the like. It will be appreciated that any number of different devices may be provided, and that some devices may use the same protocols and the same data format while other devices may use different protocols and different data formats. Example communications 132, 134, and 136 include communications using protocols such as Ethernet, 802.11, Long Term Evolution (LTE, 3rd Generation Partnership Project (3GPP) and so on.

Figure 2:
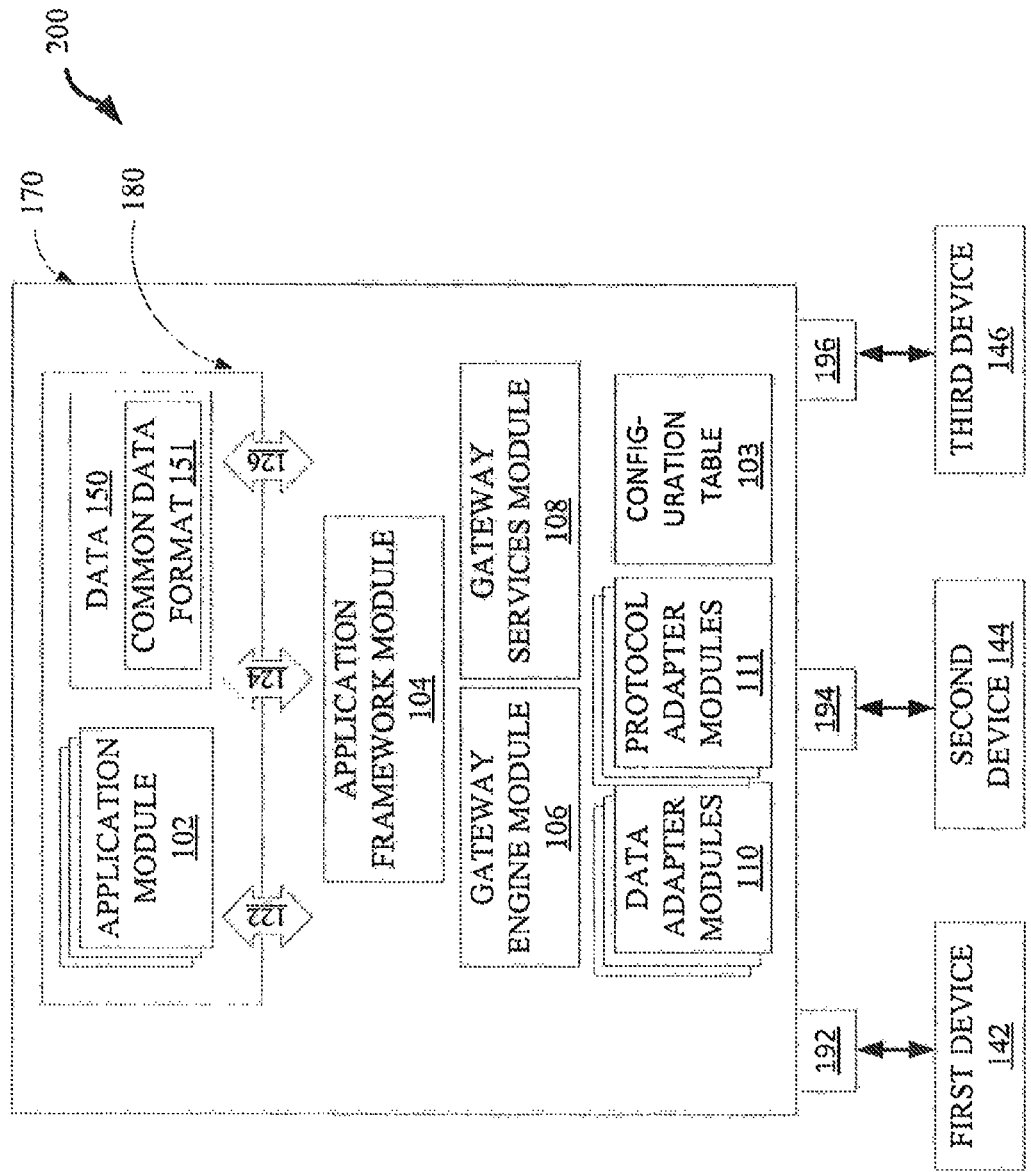
FIG. 2 illustrates an example system, in accordance with an example embodiment, of the system of FIG. 1.

Referring to FIG. 2, an example system 200, in accordance with an example embodiment, of the system of FIG. 1 is shown. The gateway 170 is shown to include one or more application module(s) 102, and a common data area 180 including data 150 in a common data format 151. The gateway 170 also includes an application framework module 104, a gateway engine module 106, and a gateway services module 108. The application framework module 104 is configured to interface the gateway engine module 106 and the gateway services module 108 to the application module(s) 102 and the common data area 180 (e.g., via Application Programming Interface (API) calls). The gateway engine module 106 responds to requests to provide services rendered by the gateway services module 108. Examples of services provided by the gateway services module 108 include sending and receiving data, and accessing services.

The gateway 200 is also shown to include a plurality of data adapter modules 110, a plurality of protocol adapter modules 111, and a configuration table 103. The data adapter modules 110 are configured to convert or change the format of incoming and outgoing data. In an example embodiment, the data adapter modules 110 may be configured to convert data between the first data format 153 and the common data format 151, convert data between the second data format 155 and the common data format 151, and configured to convert data between the third data format 157 and the common data format 151. Accordingly, in an example embodiment, three data adapter modules may be provided. However, it will be appreciated that there may be more data adapter modules. It will be appreciated that each of the data adapter modules 110 may be specifically customized for conversion of a particular data format to and from the common data format 151.

The protocol adapter modules 111 allow the gateway 200 to communicate with devices using different protocols. For example, in the system 100, a protocol adapter module 111 may be provided to communicate with the first device 142 in the first protocol 162, a protocol adapter module 111 may be provided to communicate with the second device 144 in the second protocol 164, a protocol adapter module 111 may be provided to communicate with the third device 146 in the third protocol 166, and so on (see FIG. 3).

Thus, data in various different formats, and communicated using various different protocols, can be stored in a common data format 151 and processed by various application module(s) 102. Accordingly, the application module(s) 102 can be simplified to process data in the common data format 151 instead of being more complex to deal with many different data formats used by different remote devices. Moreover, the application module(s) 102 can be simplified to communicate with remote devices by using standard calls to the application framework module 104 instead of being more complex to deal with many different communication protocols used by different remote devices.

As described in more detail below, in an example embodiment, the configuration table 103 may be used to select an appropriate data adapter from the data adapter modules 110, and select an appropriate protocol adapter from the protocol adapter modules 111 to process data conversion and communication with different remote devices.

FIG. 3 illustrates examples of a first device, a second device, and a third device forming part of the system of FIG. 1. As mentioned above, one or more of the devices 142, 144, and 146 may be a wireless device. Accordingly, the first device 142 may be a wireless mobile device such as a smartphone, a tablet computer or any other portable device connected via a wireless network (e.g., a LAN, WAN, the Internet, a cellular data network or the like). When the data network is a cellular data network, the first data format may be Hyper-Text Markup Language (HTML) and the first protocol may be 802.11 or LTE. In other embodiments, the second device 144 may include components of a machine and the second data format 155 may be American Standard Code for International Interchange (ASCII) and the second protocol 164 may be Zigbee or IEEE 802.15.4. In still other embodiments, the third device 146 may be a server, and the third data format 157 may Distributed Component Object Model (DCOM), and the third protocol 166 may be Ethernet.

The data 152, 154, 156 may also include metadata. In example embodiments, the metadata may describe properties of the data 152, 154, 156, and/or the first format 153, the second format 155, and the third format 157. In example embodiments, the metadata provides information so as to facilitate conversion of the data into the common data format 151. As an example, the metadata may indicate that the data 152, 154, 156 is in extensible mark-up language (XML), DCOM, Simple Object Access protocol (SOAP), ASCII, or any other known format. In an example embodiment, the gateway selects an appropriate data adapter based on the metadata.

Further examples of the protocol 162, 164, and 166 include 802.11x. Internet Protocol (IP), 3GPP, AppleTalk™. Long-Term Evolution (LTE), Bluetooth, token ring, WiMAX, Ethernet, virtual private network (VPN), Asynchronous Transfer Mode (ATM), passive optical subscriber loop, Integrated Services Digital Network (ISDN), physical layer protocols, media access layer protocols, network layer protocols, application layer protocols, routing protocols, address resolution protocols, or the like.

The services 172, 174, and 176 (or any other services provided in further devices) may be services that are used by one or more of the application module(s) 102. For example, the first service 172 may include turning sensors on and off based on the data 152 received from the first device 142. The second service 174 may include sending and receiving data to/from an application program on a mobile device. The third service 176 may include storing data on a remote server, querying an industrial machine to send data, and so on. Other example services include securing industrial gateways, application, services, device management, remote monitoring and diagnostics of software and devices, analytics frameworks for edge devices, supervisory control and monitoring of industrial machines, sensor data discovery and fusion, mobile access to headless devices, and so on. In example embodiments, the gateway 170 provides services that the devices may call. For example, the gateway 170 may provide a service to handle data generated by the remote devices, or store data at a backend server generated by a device.

In example embodiments, the gateway 170 allows the application module(s) 102 to get real-time access to the data 152, 154, 156 which is then converted and stored in the common data format area 180 where it is then accessible to the application module(s) 102. In example embodiments, the gateway 170 is a gateway hub that provides a huh environment, or abstraction, for the application module(s) 102.

The application framework module 104 allows the application module(s) 102 to access the gateway services module 108, the gateway engine module 106, the data adapter modules 110 and the protocol adapter modules 111 (e.g., via API calls). In example embodiments, the gateway 170 may discover devices (e.g., the devices 142, 144, and 146) on a network.

In example embodiments, the application module(s) 102 is configured to remotely monitor and diagnose devices and/or software. Moreover, the application module(s) 102 may be configured to provide analytics regarding the monitored devices and/or software to other devices and/or users.

Figure 4:
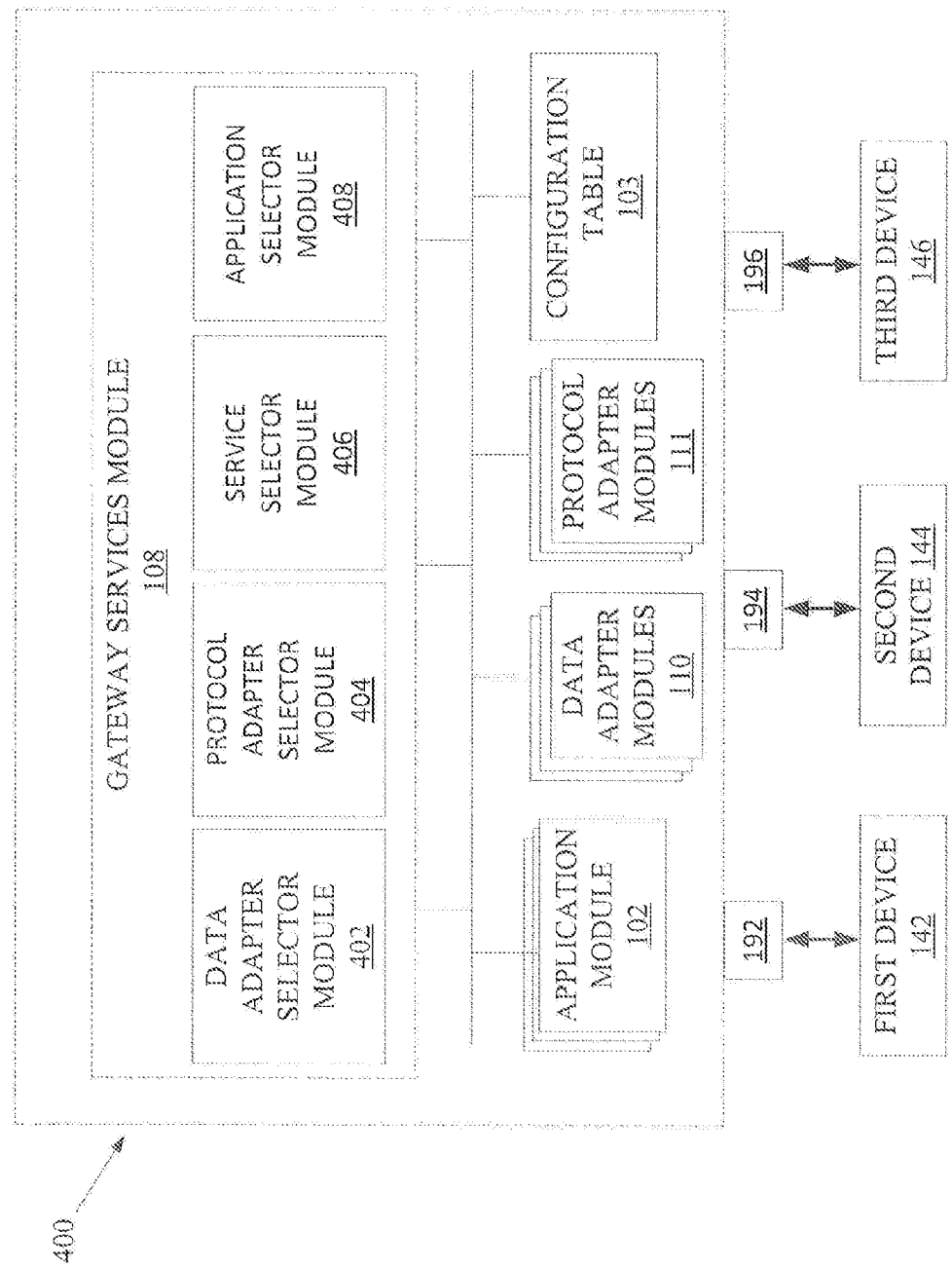
FIG. 4 illustrates another example embodiment of a gateway, in accordance with an example embodiment.

FIG. 4 illustrates another example embodiment of a gateway 400, in accordance with an example embodiment. The gateway 400 substantially resembles the gateway 170 and thus includes similar modules. The gateway 400 is shown to include a gateway services module 108 including a data adapter selector module 402, a protocol adapter selector module 404, a service selector module 406, and an application selector module 408. The gateway 400 is also shown to include the application module(s) 102, the data adapter modules 110, the protocol adapter module 111, and the configuration table 103. In an example embodiment, based on data in the configuration table 103, the selector modules 402, 404, 406, 408 select an appropriate data format, protocol, services, and application to communicate with an associate device (e.g., the devices 142, 144, and 146).

Figure 5:
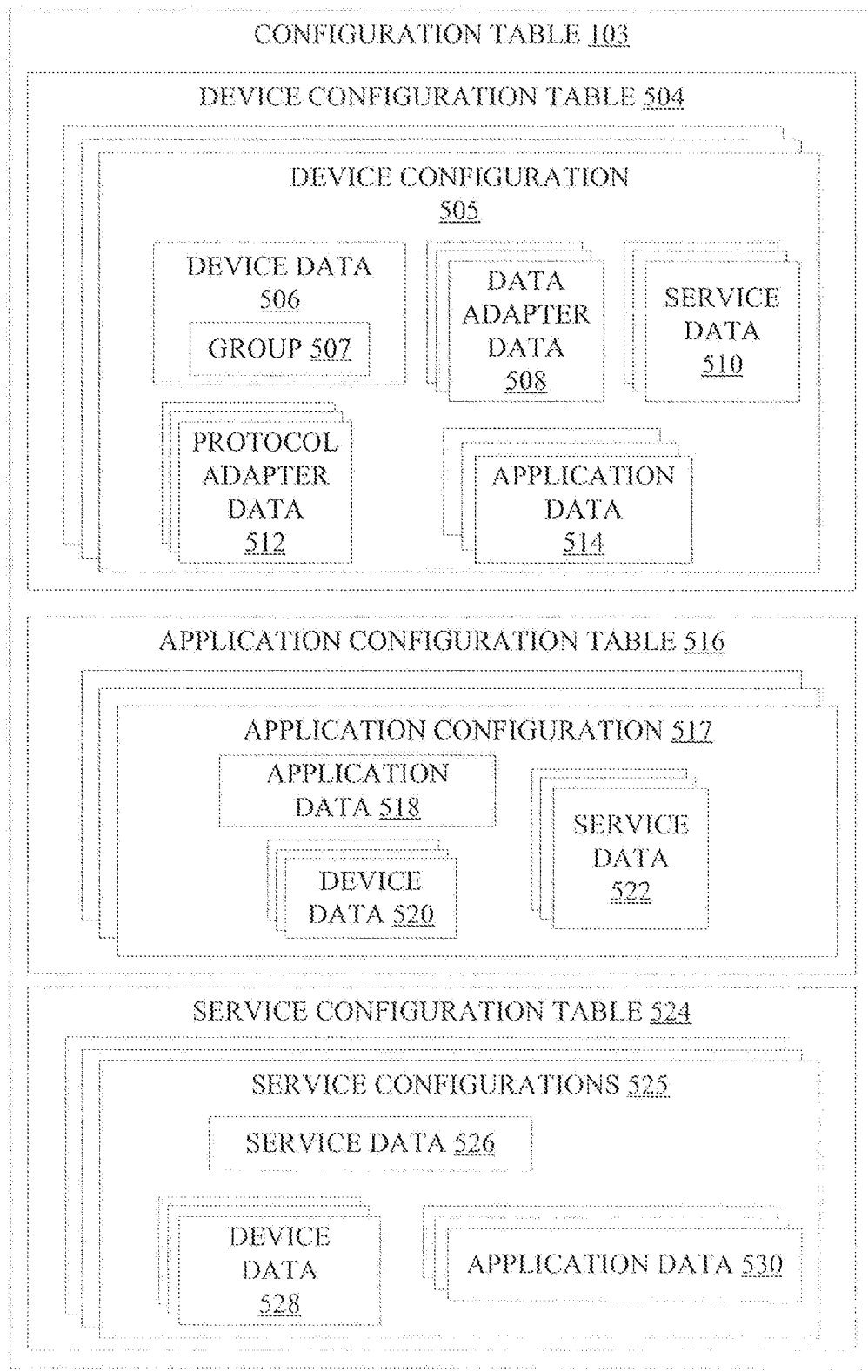
FIG. 5 illustrates a configuration table, in accordance with an example embodiment, for use in the gateway of FIG. 4.

FIG. 5 illustrates a configuration table 103, in accordance with an example embodiment, for use in the gateway 400. It is to be noted that the configuration table 103 may also be used in the gateways 170 and 200. The configuration table 103 is shown to include a device configuration table 504, an application configuration table 516, and a service configuration table 524.

The device configuration table 504 is shown by way of example to include device configurations 505 that include device data 506, a data adapter data 508, service data 510, protocol adapter data 512, and application data 514. The device data 506 may be an indication of a device (e.g., the devices 142, 144, 146) and may include data to configure the device. The device data 506 may include a group 507, which may indicate a group the device is part of. For example, there may be many sensor devices (e.g., devices 142, 144, 146), and the gateway 400 may provide logical and functional grouping of the devices into groups. For example, the gateway 400 may group all data received from a group together for an application module 102 to process.

The service data 510 may indicate services (e.g., the services 172, 174, 176) provided by the device. For example, a remote server device may provide a service to store data. The protocol adapter data 512 may indicate protocol adapter modules (e.g. protocol adapter modules 111) that may be used for the device. The data adapter data 508 may indicate adapter modules (e.g. data adapter modules 110) that may be used for the device. Moreover, the data adapter data 508 may indicate additional parameters for the data adapter module such as a directory to use on the device to access or store remote data. The application data 514 may indicate application modules (e.g. application modules 102) that are associated with the device. For example, the application data 514 may indicate which application module 102 to notify if data is received from the device. As another example, the application data 514 may include security information regarding which application modules 102 are permitted to access the device. The applications referred to in application data 514 may have an entry in the application configuration table 516.

TABLE 1

DEVICE CONFIGURATION TABLE

| DEVICE DATA | DATA ADAPTER DATA | SERVICE DATA | PROTOCOL ADAPTER DATA | APPLICATION DATA |
|---|---|---|---|---|
| thermometer 192.168.8.1 | machine adapter | send data | OPC adapter | |
| Backendserver.com 192.168.8.102 | Backendserver adapter | Store, Retrieve | HTTP | process sensor data |
| mobile 192.168.8.193 | mobile adapter | mobile app | 802.11 | process sensor data |

Table 1 illustrates an example of the device configuration table 504 of FIG. 5 with three device configurations 505 of remote devices (e.g., devices 142, 144, 146) one per row. The device data 506 of the first row indicates that the remote device has a name of "thermometer" and an IP address of 192.168.8.1. The gateway 400 may identify or access the remote device using the name or IP address. The data adapter data 508 of the first row indicates that "machine adapter" may be used to adapt the data from the format of the "thermometer" (e.g., formats 153, 155, 157) to the common format 151. The service data 510 indicates that the remote device has a service (e.g., services 172, 174, 176) called "send data." The service data 510 may include information regarding the type of service and how to call the service on the device. An application module 102 may use this "send data" service to tell the "thermometer" to send temperature readings to the gateway 400. The service data 510 may also include information for the gateway 400 to identify that a communication from the device is from this service. For example, the gateway 400 may determine that a communication from the "thermometer" is from the "send data" service based on port of the of the network interface (e.g., network interfaces 192, 194, 196), or, as another example, there may be identifying text.

The protocol adapter data 512 indicates that an "OPC adapter" may be used to communicate with the "thermometer." The application data 514 indicates that "process sensor data" is an application module 102 that accesses the "thermometer". Process sensor data may be an application module 102, which is described in conjunction with FIG. 7, where sensor data is received, fused, and then stored on a remote server, and where the results are reported to a mobile device. In a similar fashion rows two and three of Table 1 provide a device configuration 505 for a "backendserver.com" and a "mobile".

The application configuration table 516 is shown by way of example to include application data 518, device data 520, and service data 522. The application data 518 may indicate an application module (e.g. application module 102) and may indicate other configuration data regarding the application module such as how large the application module is, where the application module is stored on the gateway 400, whether the application module is stored on a remote server, where to get updates for the application module, a security level of the application, etc. The device data 520 may indicate one or more devices (e.g., the devices 142, 144, 146) associated with the application module. For example, the device data 520 may indicate which devices the application module has accessed and how the application module accessed the device (e.g. received data, sent data, or accessed a service), and how to call the application module for a particular device (e.g., different parameters to call the application may be used depending on the device). The device referred to in device data 520 may have a device configuration in the device configuration table 504.

The service data 522 may indicate one or more services (e.g., the services 172, 174, 176) associated with the application module. For example, the service data 522 may indicate which services the application module has accessed and how the application module accessed the service. The service may have a services configuration 525 in the service configuration table 524. Additionally, the service data 522 may indicate a preference or required service for the application module. For example, the application module may request a service (e.g. to store data) from the services selector module 406, and the services selector module 406 may determine which service to access for the application module based on the service data 522 for that application module.

TABLE 2

APPLICATION CONFIGURATION TABLE

| APPLICATION DATA | DEVICE DATA | SERVICE DATA |
| --- | --- | --- |
| process sensor data | thermometer 192.168.8.1; Backendserver.com, 192.168.8.102; mobile, 192.168.8.193 | send data, store, mobile app |

Table 2 illustrates an example of the application configuration table of FIG. 5 with one application configuration for "process sensor data". The application data 518 may be the name of application module "process sensor data". The "process sensor data" application module may an application module 102 as described in conjunction with FIG. 7. The application data 518 may include data related to how to run the application module and may include security information for the application module. The device data 520 may be "thermometer", which may be a device as described above. The device data 520 may also include "backend server", which may be a backend server device. For example, "backend server" may be the second device 144 as described in conjunction with FIG. 7. The device data 520 may also include "mobile", which be the third device 146 as described in conjunction with FIG. 7. The service data 522 may include "send data", which may be associated with the "thermometer" as described above, "store", which may be associated with the "backend server", and "mobile app", which may be services associated with the "mobile". The services may have entries in the service configuration table 524.

The service configuration table 524 is shown by way of example to include service data 526, device data 528, and application data 530. The service data 526 may indicate a specific service (e.g., services 172, 174, 176) or a general type of service, and may indicate other configuration data regarding the service such as security information needed to access the service. The device data 528 may indicate devices (e.g., devices 142, 144, 146) where the service may be accessed. The devices may have entries in the device configuration table 504. The application data 520 may indicate application modules (e.g., application modules 102) that have accessed the service or, in some embodiments, that have permission to access the service. The application data 530 may include an application module to call if the service makes a call to the gateway 400, which may be configured to access the service configuration table 524 to determine which application module 102 to invoke for the service.

TABLE 3

SERVICES CONFIGURATION TABLE

| SERVICE DATA | DEVICE DATA | APPLICATION DATA |
| --- | --- | --- |
| send data | thermometer 192.168.8.1 | processor sensor data |
| Store | backendserver.com, 192.168.8.102 | processor sensor data |
| mobile app | mobile 192.168.8.193 | processor sensor data |

Table 3 illustrates an example of the services configuration table of FIG. 5. The service data 518 may be "send data", which is the name of the service. The device data 528 may be "thermometer", which may be a device that provides the service as described above. The device may be a device such as the first device 142 as described in conjunction with FIG. 7. The application data 530 may be "process sensor data" as described above. The application data 530 may include security information for the application module 102 that indicates whether the application can access the service, and, in some embodiments, how the application may access the service. Similarly, "store" and "mobile app" are described in Table 3.

Returning to FIG. 4, in example embodiments, the protocol adapter selector module 404 is configured to select a corresponding protocol adapter module 111 to use to communicate with a remote device (e.g. devices 142, 144, 146). For example, the gateway 400 may receive a communication from a device 142, 144, 146. The protocol adapter selector module 404 may identify which device 142, 144, 146 sent the communication by the device data 506. For example, from Table 1, the received communication may have an IP address associated with it of 192.168.8.102. The protocol adapter selector module 108 may then determine that the received communication is from device "backendserver.com". The protocol adapter selector module 404 may then determine from protocol adapter data 512 of Table 1 that the appropriate protocol adapter is an HTTP protocol adapter module. Similarly, the protocol adapter selector module 402 may also be configured to determine which protocol adapter module 111 to select for a communication from the gateway 400.

In example embodiments, the data adapter selector module 402 is configured to select a corresponding data adapter module 110 to use to convert data 152, 154, 156 between the common data format 151, and the format (e.g. formats 153, 155, 157) used by a corresponding remote device (e.g., devices 142, 144, and 146). For example, the data adapter selector module 402 may be configured to select a corresponding data adapter module 110 to convert data between the common data format 151 and one of the first format 153, the second format 155, or the third format 157 using the configuration table 103 to select the corresponding data adapter module 110. For example, referring to Table 1, the data adapter selector module 402 may select "machine adapter" to adapt data received from a "thermometer".

The service selector module 406 may be configured to select an appropriate service (e.g., services 172, 174, 176) for an application module 102 to call. For example, an application module 102, "process sensor data", may request a service to store "thermometer" sensor data. The service selector module 406 may search the service configuration table 524 for a service to store the "thermometer" sensor data and retrieve the "store" service configuration 525, and determine from this that "store" service from "backendserver.com" is appropriate.

The application selector module 408 may be configured to select an appropriate application module 102 for a received communication using the configuration table 103. For example, the gateway 400 may receive a communication from a device (e.g., devices 142, 144, 146), and the protocol adapter selector module 404 may determine which device the communication was received from. The application selector module 408 may then access the device configuration 505 and determine an appropriate application module 102 to call to process the received communication. As example, the gateway 400 may receive a communication. The protocol adapter selector module 404 may determine from Table 1 that the communication is from the "thermometer", and then the application selector module 408 may determine that the appropriate application module 102 to call to process the received communication is "process sensor data." The application will then process the communication from the device. For example, the gateway 400 may receive a communication from a "thermometer" to store data. The application selector module 408 may select the "process sensor data" to respond to the request from the "thermometer" to store data. The "process sensor data" may then access an appropriate service to store the data from the "thermometer".

Figure 6:
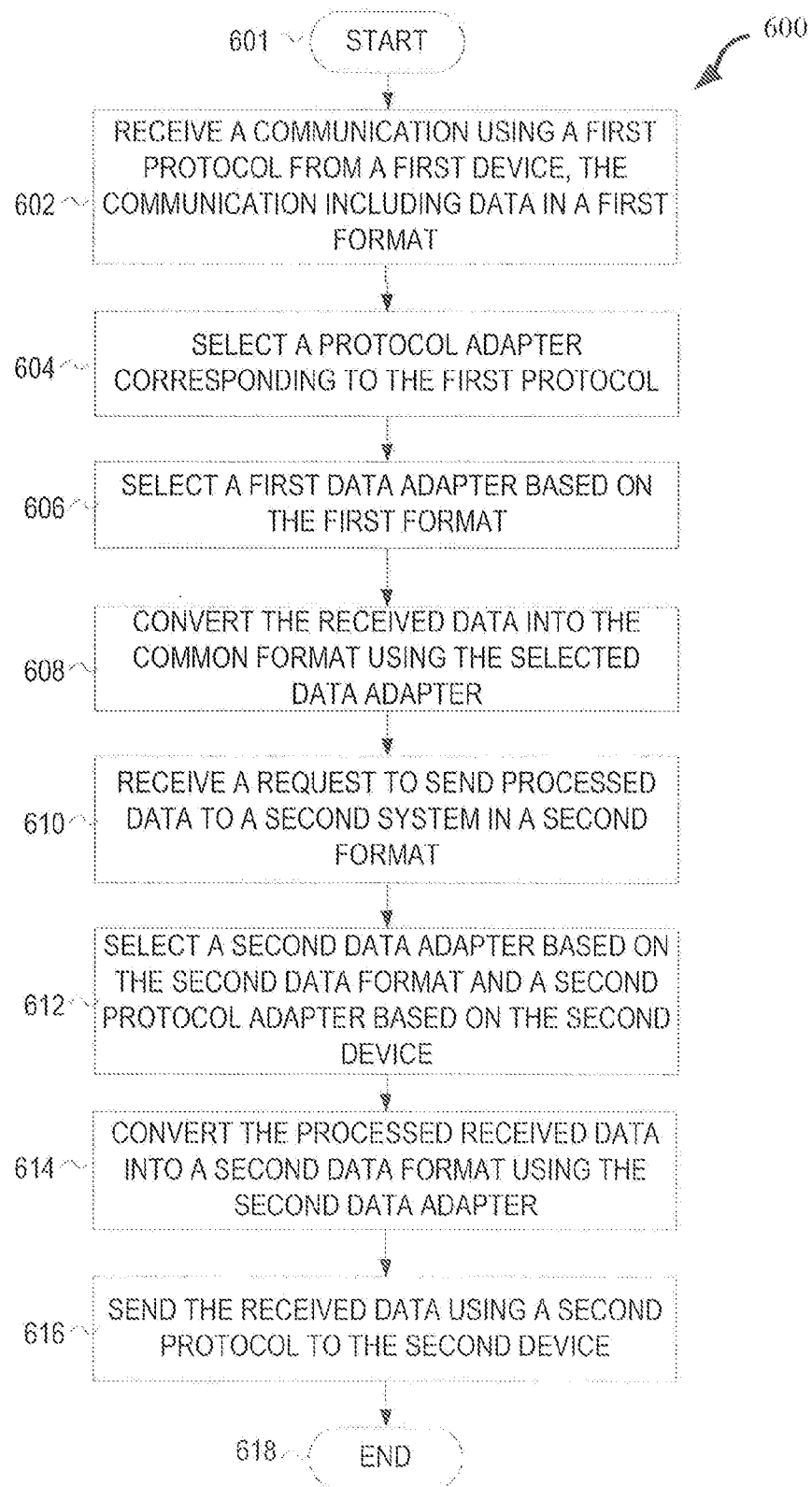
FIG. 6 illustrates a method, in accordance with an example embodiment, for converting data at a gateway from a first data format to a second data format using a common data format.
Figure 7:
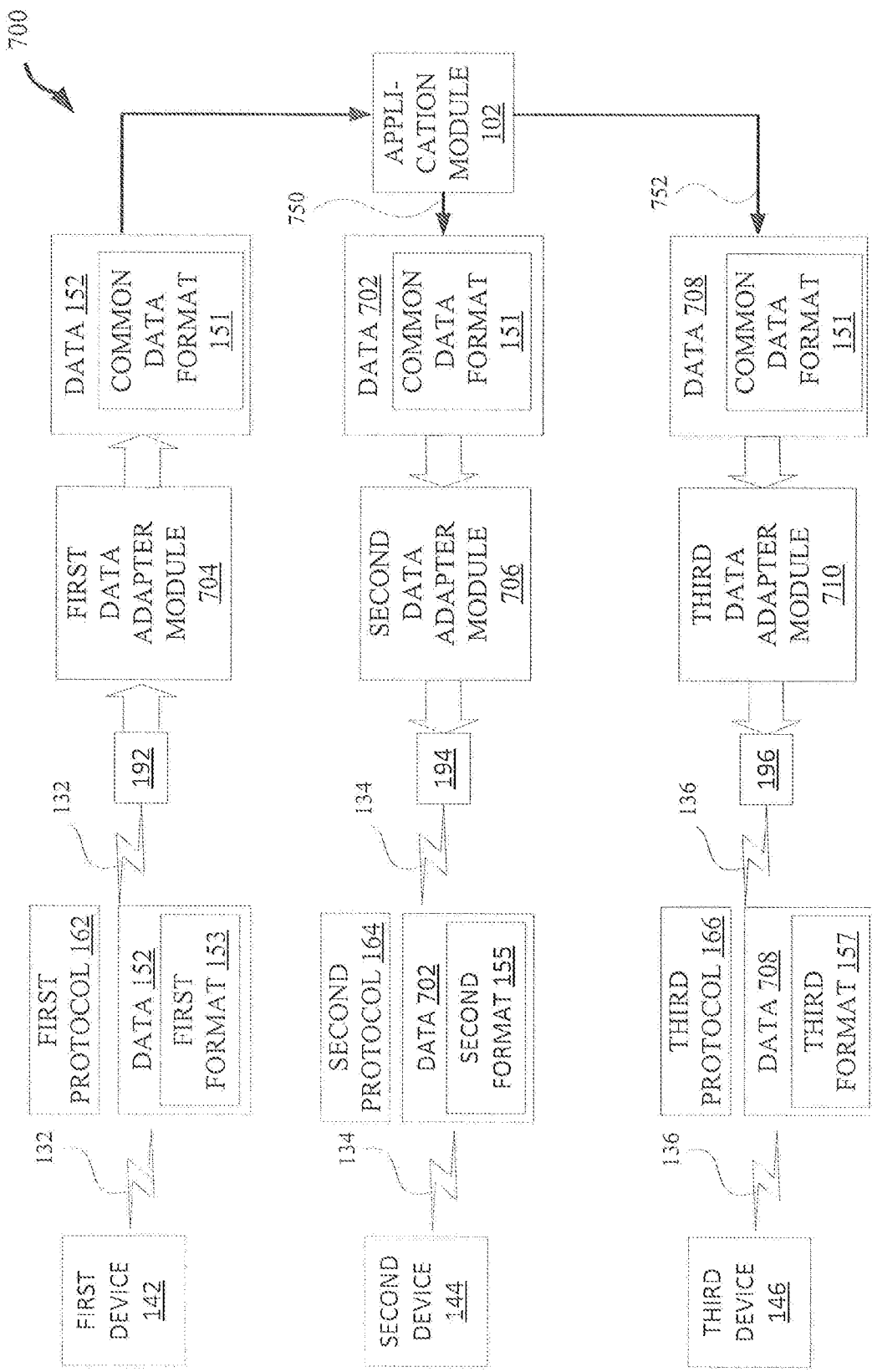
FIG. 7 illustrates an example application of the method of FIG. 6 in the system of FIG. 1 and the gateway of FIG. 2.

FIG. 6 illustrates a method 600, in accordance with an example embodiment, for converting data at a gateway from a first data format to a second data format using a common data format. The method 600 may be deployed on the gateways 170 and 400 and, accordingly, are described merely by way of example with reference thereto. FIG. 7 illustrates an example deployment of the method 600 in the system 100 of FIG. 1 and the system 200 of FIG. 2.

The method 600 starts at operation 601 and then continues at operation 602 where a communication is received in a first protocol from a first system or device where the communication includes data in a first format. For example, referring to FIGS. 1, 2, and 3, the first system 142 may send data 152 in the first format 153 using the first protocol 162 as shown by communication 132 (see FIGS. 1 and 7). Thereafter, as shown at operation 604, the gateway services module 108 (see FIG. 2) determines a corresponding protocol adapter module 111 to process the communication. In example embodiments, the gateway services module 108 uses the configuration table 103 (see FIG. 5) to select the corresponding protocol adapter module 111.

The method 600 continues at operation 606 wherein a corresponding data adapter module (e.g., one of the data adapter modules 110) is selected to convert the data in the first format 153 to data in the common data format 151 (see operation 608 and FIG. 7). One or more of the application module(s) 102 may then process that data and provide an associated service. For example, the first format 153 may be a proprietary format with meta-characters for collecting data from industrial machines that may be converted into Extensible Markup Language (XML) as the common data format 151.

As shown in operation 610, upon receipt of a request from a second device (e.g., the second device 144) to receive data, the method 600 may then select a second protocol adapter (e.g., from the protocol adapter modules 111 and select a second data adapter (e.g., from the data adapter modules 110), corresponding to the second device (e.g., the device 144) as shown at operation 612. In example embodiments, the gateway services module 108 uses the configuration table 103 (see FIG. 5) to select the corresponding protocol adapter module 111 and data adapter module(s) 110.

The method 600 then continues at operation 612 with the relevant data is converted from the common data format 151 (e.g., XML) to the second data format (see operation 614). Thereafter, the converted data is communicated using the selected protocol adapter to the second device (e.g., the second device 144) as shown at operation 616. The data sent to the second device 144 may be fused data and the method 600 may then end at operation 618.

Figure 8:
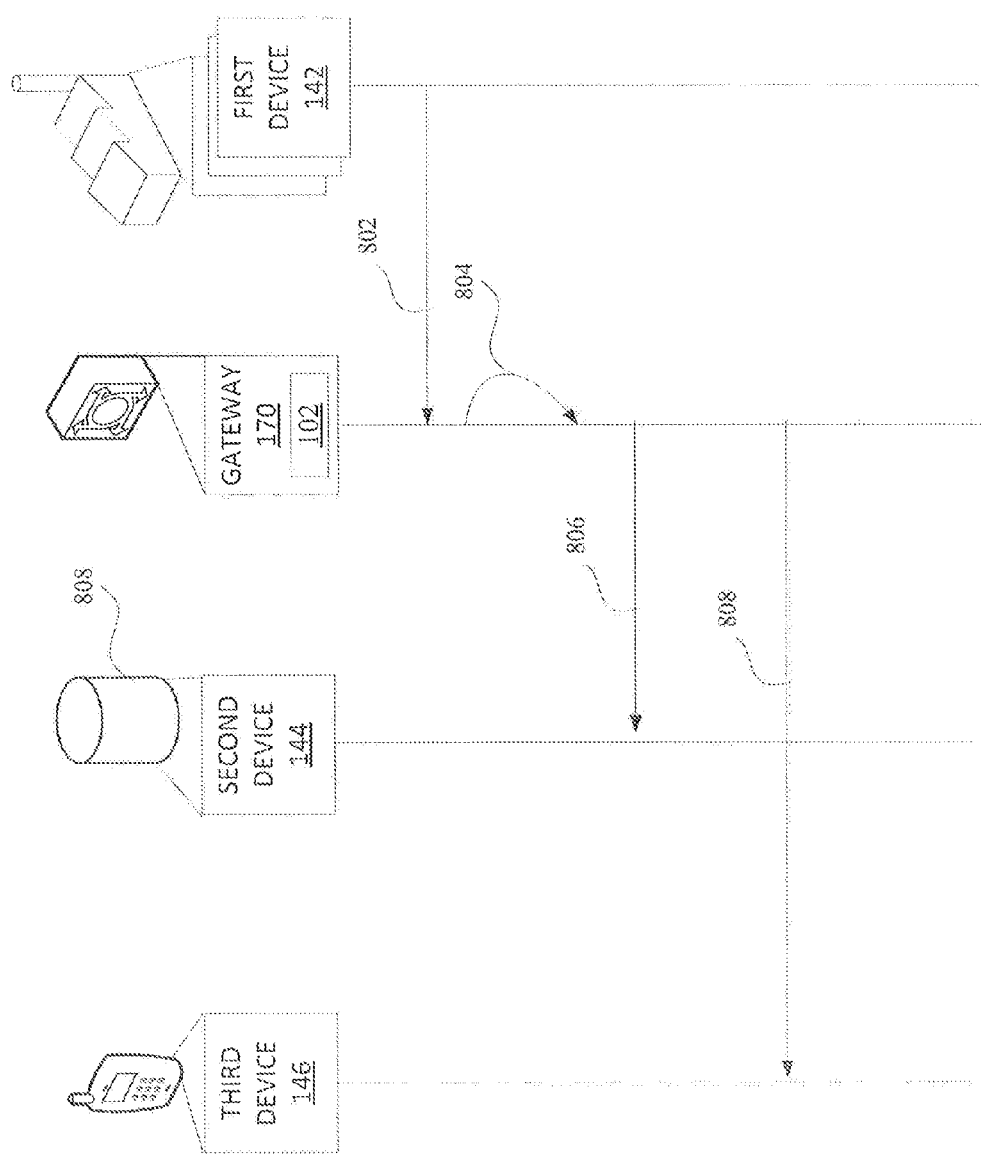
FIG. 8 illustrates an example of an interaction diagram of communications between the gateway and the devices of FIG. 1.

In an example embodiment, the application module(s) 102 create fused data after, for example, receiving the data from the first device 142. When the device 142 forms a component or part of an industrial machine. As shown by way of example in FIG. 8, data 802 may be sent from the first device 142 to the gateway 170 where it is processed in accordance with the method 600. Thereafter, the data may be processed into fused data. The fused data may then be converted (see operation 804) and communicated (see operation 806) to the second device 144 where it may be persisted in a database. In addition, the fused data may be converted (see operation 808) and communicated (see operation 810) to a third device 146 in the form of a mobile device. The data may then be processed or viewed using a mobile application running on the mobile device. In an example embodiment, the mobile application may allow a user to control operation of one or more industrial machines. The second device 144 may be a server system that maintains records of the operation of the industrial machine(s). Accordingly, in the given example, the gateway 170 can facilitate communications to/from various different devices that use different protocols.

In example embodiments, the gateways 170, 400 are located or provided at edge devices where an edge device is a device that provides an entry point into a network (e.g. switches, routers, multiplexers). Accordingly, functionality performed by the application module(s) 102 takes place at an edge device. As the gateways 170, 200 have a plurality of data adapter modules 110 and a plurality of protocol adapter modules 111, interfacing of different devices using different data format and protocol can be done at the edge device.

Figure 9:
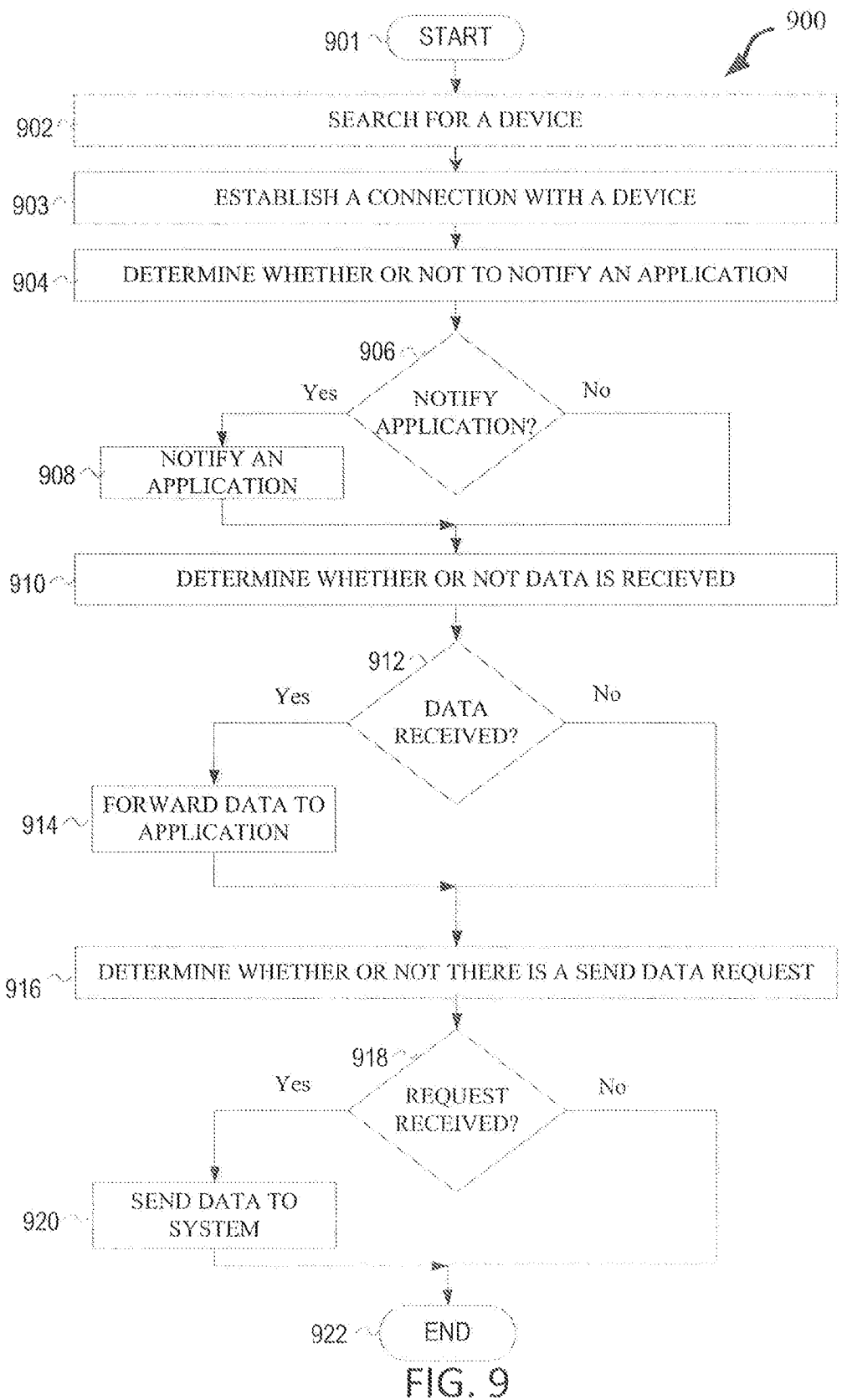
FIG. 9 illustrates a further method, in accordance with an example embodiment, for communicating data to a remote device from a gateway with a common data format for applications.

FIG. 9 illustrates a further method, in accordance with an example embodiment, for communicating data to a remote device from a gateway with a common data format for applications. The method 900 may be deployed on the gateways 170, 200 and, accordingly, are described merely by way of example with reference thereto. In the method 900 the device (e.g., one of more of the devices 142, 144, 146) is a device such as a server system, mobile device, or machine component.

The method 900 optionally begins at operation 902 with search for a device. For example, the gateway 170 may listen for beacon frames from devices or actually send out queries regarding devices that the gateway 170 may communicate with. For example, in an embodiment, the gateway 170 may be a home or factor gateway which may discover all the active devices that the gateway may communicate with.

The method 900 continues at operation 903 with establishing a connection with a device as shown at operation 903. An appropriate data adapter module (e.g., an adapter module 142) and protocol adapter module (e.g., one of the protocol adapter modules 111) may be identified and selected to effect communication with the device. In example embodiments, the gateway 170, 400 may establish secure communications with the device. In example embodiments, the gateway engine module 106 determines the appropriate data adapter module based on calling the gateway services module 108. For example, the gateway services module 108 may look up the system or a service associated with the system in the configuration table 103, and determine the appropriate data adapter module (e.g., selected from the data adapter modules 110) based on the system or service required.

Thereafter, the method 900 continues at operation 904 and determines whether or not to notify an application. For example, the gateway services module 108 may determine whether or not to notify an application module 102 of the establishment of a connection with the device (e.g., the first device 142, second device 144, or third device 146). In example embodiments, the gateway service module 108 or gateway engine module 106 may access the configuration table 103 that indicates whether or not to notify an application module 102 upon establishment of a connection with the device (see decision operation 906).

The method 900 then continues at operation 906 with notify application. If it is determined that the application is to be notified, a notification is sent to the application (see operation 908) and the method proceeds to operation 910. If, however, the application does not need to be notified then the method proceeds directly to operation 910. In operation 910, the method 900 determines whether or not data has been received.

Thereafter, the method 900 continues at decision operation 910 where a determination is made to determine whether or not data is received from the device. If no data has been received, then the method 900 proceeds directly to operation 916 where a determination is made whether or not a request for data is to be sent to the device. However, if data has been received from the device, the data is then sent to the relevant application (e.g., one of the application module(s) 102) for processing. In example embodiments, the gateway services module 108 or the gateway engine module 106 determines whether or not data has been received from the devices 142, 144, 146 and, for example, stored as new data (e.g., data 150) in the common data format 151. The method the proceeds to operation 916.

As shown at decision operation 918, if a request fir data has been received, then the requested data may be sent to the device (see operation 920), if, however, a request has not been received, then the method 900 proceeds to operation 922 where the method 900 terminates. The method 90) may return to operation 901 and execute continually while the gateway is active.

Figure 10:
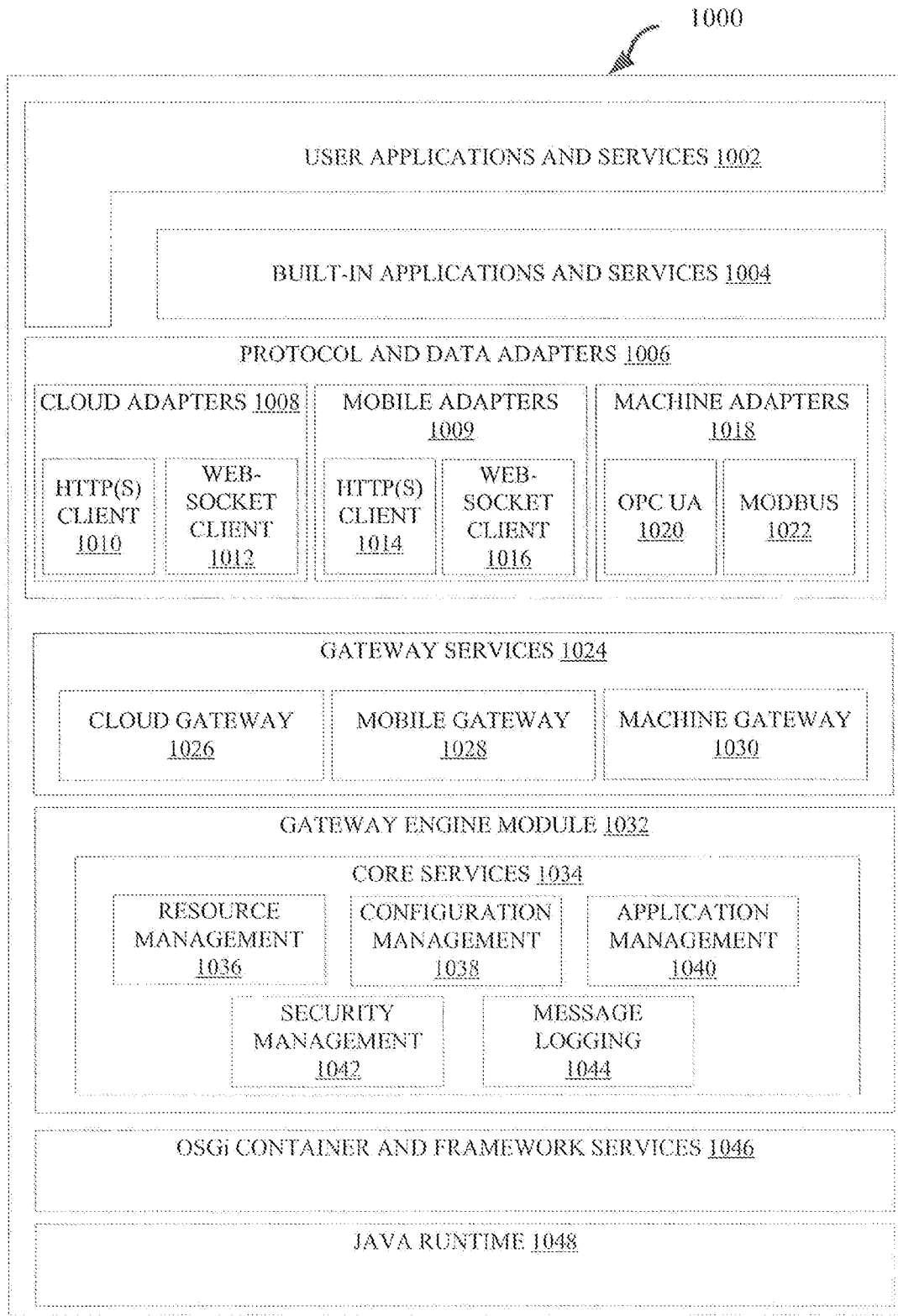
FIG. 10 illustrates a gateway, in accordance with an example embodiment, to convert data using a common data format.

FIG. 10 illustrates a gateway 1000, in accordance with an example embodiment, to convert data using a common data format. The gateway 1000 may be deployed in the gateways 170, 400 and, accordingly, is described merely by way of example with reference thereto. The gateway 1000 is shown to include user applications 102, built-in applications and services 1004, protocol and data adapters 1006, gateway services 1024, a gateway engine module 1032, an Open Service Gateway initiative (OSGi) container and framework services 1046, and a JAVA runtime engine 1048.

The various components of the gateway 1000 may be arranged in a stack where the user applications and services 1002 are at the top of the stack. These user applications and services 1002 interact with the different layers of the stack. However, the user applications and services 1002 do not necessarily depend on the built-in applications and services 1004. In example embodiments, the user applications and services 1002 include application modules similar to, or the same as, the application modules 102. When included, the application modules 102 have access to data in a common data format (e.g., the common data format 151) communicated via the gateway services 1024.

The gateway services 1024 may include a plurality of gateway services such as, for example, a cloud gateway 1026 (e.g., machine to cloud (C2M)), a mobile gateway 1028 (e.g., machine to human (M2H)), a machine gateway 1030 (machine-to-machine gateway (M2M)), and various other gateways. Accordingly, the protocol and data adapters 1006 are shown to include a cloud adapter, a mobile adapter 1009 and machine adapters 1018. It will be appreciated that other data and protocol adapters may also be provided. The functionality performed by the protocol and data adapters 1006 may be similar or the same as the functionality performed by the data adapter modules 110 and the protocol adapter modules 111 and, optionally, use configuration table similar to the configuration table 103. The gateway services 1024 may be configured to provide centralized configuration, monitoring, and automatic management of the adapters 1010, 1012, 1014, 1016, 1020, 1022 that run as plug-ins within the example gateways 1026, 1028, 1030.

The cloud adapters 1008 include an Hypertext Transfer Protocol and/or Hypertext Transfer Protocol secure (HTTP(S)) client 1010 and a web-socket client 1012 configured to communicate with the cloud gateway 1008. In a similar fashion, the mobile adapters 1009 include an HTTP (S) client 1014 and a web-socket client 1016 configured to communicate with the mobile gateway 1028, and the machine adapters 1018 include an object linking and embedding (OLE) for process control (OPC) unified architecture (UA) (OPC UA) 1020 and a Modicum bus (MODBUS) 1022 configured to communicate with the machine gateway 1030. In an example embodiment, the protocol and adapters 1006 provide a single interface to the user applications and services 1002. In an example embodiment, the gateway 1000 performs one of more of the methods and functionality described herein before. For example, the gateway 1000 may form part of the system 100 and perform the methods 600 and 900.

In example embodiments, the built-in applications and services 1004 include applications that solve common needs, such as data aggregation, modeling, persistence, monitoring, alarm generation, and so on. In example embodiments, the user applications and services 1002 may call the built-in applications and services 1004. Third party developers or users may make use of the built-in applications and services 1004 in developing proprietary (or otherwise) applications modules.

As mentioned above, the gateway 1000 may be deployed in the system 100. Accordingly, the cloud adapters 1008, the mobile adapters 1009, and the machine adapters 1018 can be configured to communicate using protocols and data models, with the first system 142, the second system 144, or the third system 146 (see FIG. 1).

The OPC UA 1020 may be implemented by an application that is used by the machine gateway 1030 to communicate with a server that complies with the OPC UA specification. For example, the first device 142 may operate in accordance with OPC UA specifications and the machine gateway 1030 may use the OPC UA 1020 machine adapter 1018 to communicate with the first device 142. The MODBUS 1022 is an application that may be used by the machine gateway 1030 to communicate in accordance with the MODBUS standard with a server or device that operates in accordance with the MODBUS standard.

In example embodiments, the adapters 1010, 1012, 1014, 1016, 1020, and 1022 can also read/write data and subscribe for data updates from servers or devices (e.g., the first device 142, the second device 144, and the third device 146).

In example embodiments, the gateway services 1024 are configured to send and receive data to servers or devices such as the first device 142, the second device 144, and the third device 146.

In example embodiments, the gateway engine 1032 includes core services modules 1034. The core services modules 1034 are shown by way of example to include a resource management module 1036, a configuration management module 1038, an application management module 1040, a security management module 1042, and a message logging module 1044. In example embodiments, gateway engine module 1032 is configured to provide a runtime environment and to manage one or more of the gateway services 1024, the protocol and data adapters 1006, the built-in applications and services 1004, and the user applications and services 1002. In example embodiments, the gateway engine 1032 uses an OSGi framework and various OSGi framework services to manage the lifecycle of the user applications and services 1002. In example embodiments the gateway 1000 is developed using the JAVA runtime engine 1048.

Further to the core services module 1034, the resource management module 1036 may be configured to manage the various resources of the gateway 1000. For example, the resource management module 1036 may manage the memory allocation (e.g., memory allocation for the common data format 151). In example embodiments, the configuration management module 1038 manages the configuration of the gateway 1000, and the application management module 1040 manages the applications and services in the user application and services 1002. The security management 1042 module may be configured to manage the security of communications and message logging module 1044 may log messages.

Figure 11:
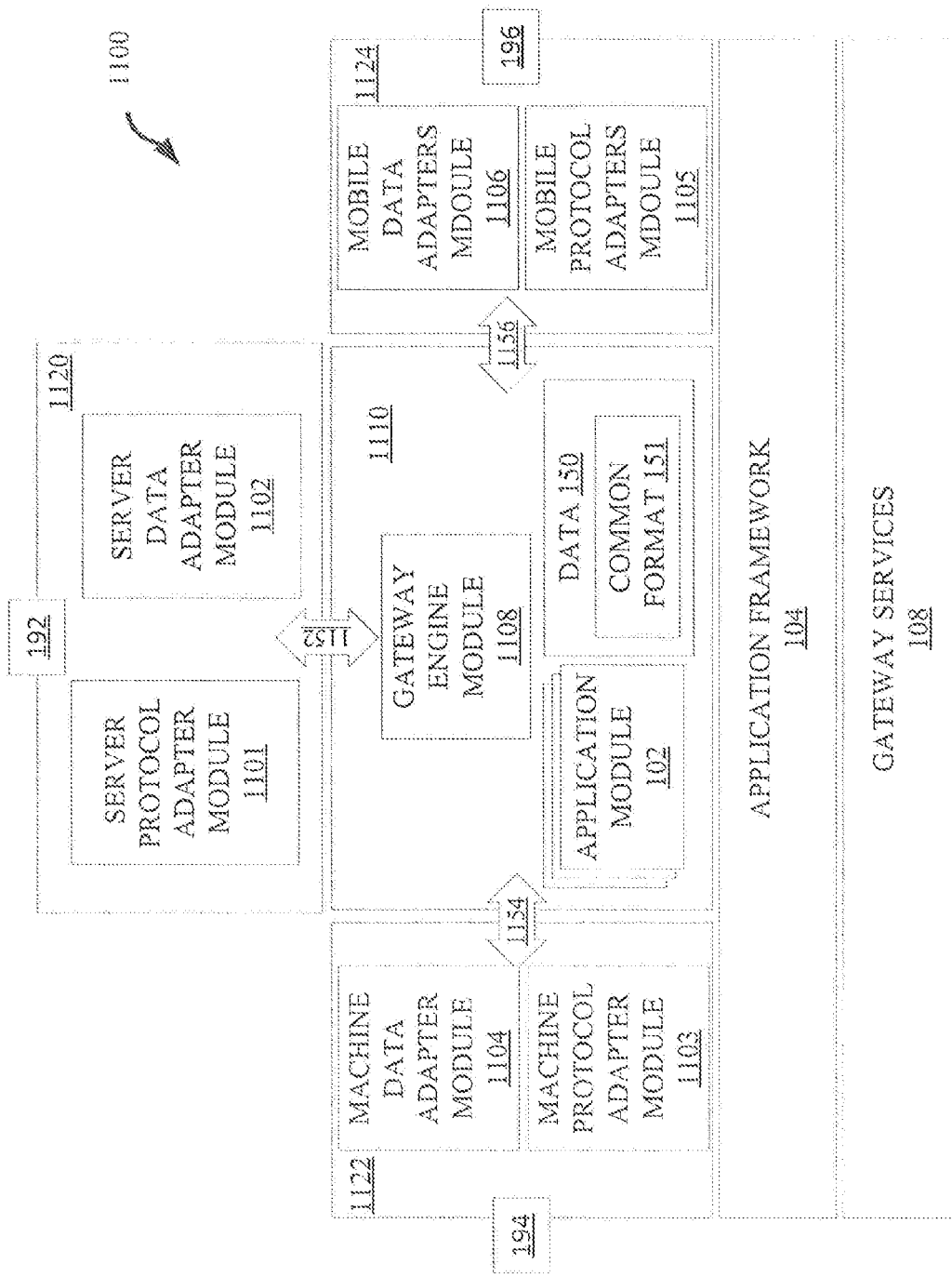
FIG. 11 illustrates a gateway, in accordance with another example embodiment, to facilitate communication between a server, industrial machines, and a mobile device.

FIG. 11 illustrates a gateway 1100 with a common data format, in accordance with another example embodiment. Illustrated in FIG. 11 are a gateway 1100, common data format area 1110, a machine network interface device 192, a server network interface device 194, a mobile network interface device 196, first conversion 1152, a second conversion 1154, a third conversion 1156, application framework 104, gateway services 108, server gateway 1120, machine gateway 1122, and mobile gateway 1124.

In example embodiments, the common data format area 1110 includes gateway engine module 1108, application modules 102, and data 150, which has a common data format 151. In example embodiments, the common data format area 1110 provides an environment where application modules 102 may operate on data 150 and send and receive data of a different format from external systems. The gateway engine module 1108 may be configured to receive and send data 150 to one or more of the gateways 1120, 1122, and 1124. In some embodiments, the gateway engine module 1108 may be configured as disclosed in conjunction with FIG. 2.

The gateways 1120, 1122, 1124 provide a gateway 1120, 1122, 1124 between the common data format area 1110 and an external system. The protocol adapter modules 1101, 1103, 1105, and the data adapter modules 1102, 1104, 1106 provide an abstraction between data domains of devices 142, 144, 146 (see FIG. 1) and the application modules 102.

The server data adapter module 1102, the machine data adapter module 1104, and the third adapter module 1106 take data in a different format from external systems and convert 1152, 1154, 1156 the data in a different format into the common data format 151. The server data adapter module 1102, the machine data adapter 1104, and the mobile data adapter 1106 may be configured to use communication protocols for the external systems. In example embodiments, the gateways 1120, 1122, 1124 may be modular so that additional gateways 1120, 1122, and 1124 can be added to the gateway 1100.

In example embodiments, the application framework 104 provides an application programming interface (API) to access the gateway services 108. In example embodiments, the server data adapter 1102, the machine data adapter 1104, the mobile data adapter 1106, the gateway engine module 1108, and the application modules 102 use the API provided by the application framework 104. In example embodiments, the gateway services 108 uses Open Service Gateway initiative (OSGi) and a Java® runtime environment.

The systems and methods described herein may facilitate connectivity and communication between industrial data systems/machines, cloud-based services, and mobile applications. In an example embodiment, connectivity between networked devices (e.g., mobile devices) and industrial systems where the industrial system is isolated within separate control networks may be facilitated. In example embodiments, example deployments of the technology described herein may be in resource-constrained devices that can be integrated into existing systems and networks. This may allow real-time data to flow from the industrial systems/machines into cloud-based services and mobile device users without disrupting existing data flow. The systems and methods described herein may be combined with low cost hardware platform, similar to Raspberry Pi devices, Beagle-Bone Black devices, or the like, and provide a plug-in gateway hub on top of an existing infrastructure.

In example embodiments, the gateway 170, 400, 1100 has the technical effect of processing data on an edge device so that the data does not have to be sent to a server to be processed. In example embodiments, the gateway 170, 400, 1100 has the technical effect of enabling application modules 102 to be developed using a common data format 151 independent of the data formats of different systems first system 142, the second system 144, and the third system 146. In example embodiments, the gateway 170, 400, 1100 has the technical effect of enabling application modules 102 to be developed independent of the data protocols first protocol 162, the second protocol 164, and the third protocol 166 of the different systems first system 142, the second system 144, and the third system 146, respectively. In example embodiments, the gateway 170, 400, 1100 has the technical effect of enabling devices to be added to the gateway 170, 1100 by adding data adapter modules 110, 1102, 1104, and 1106.

Figure 12A:
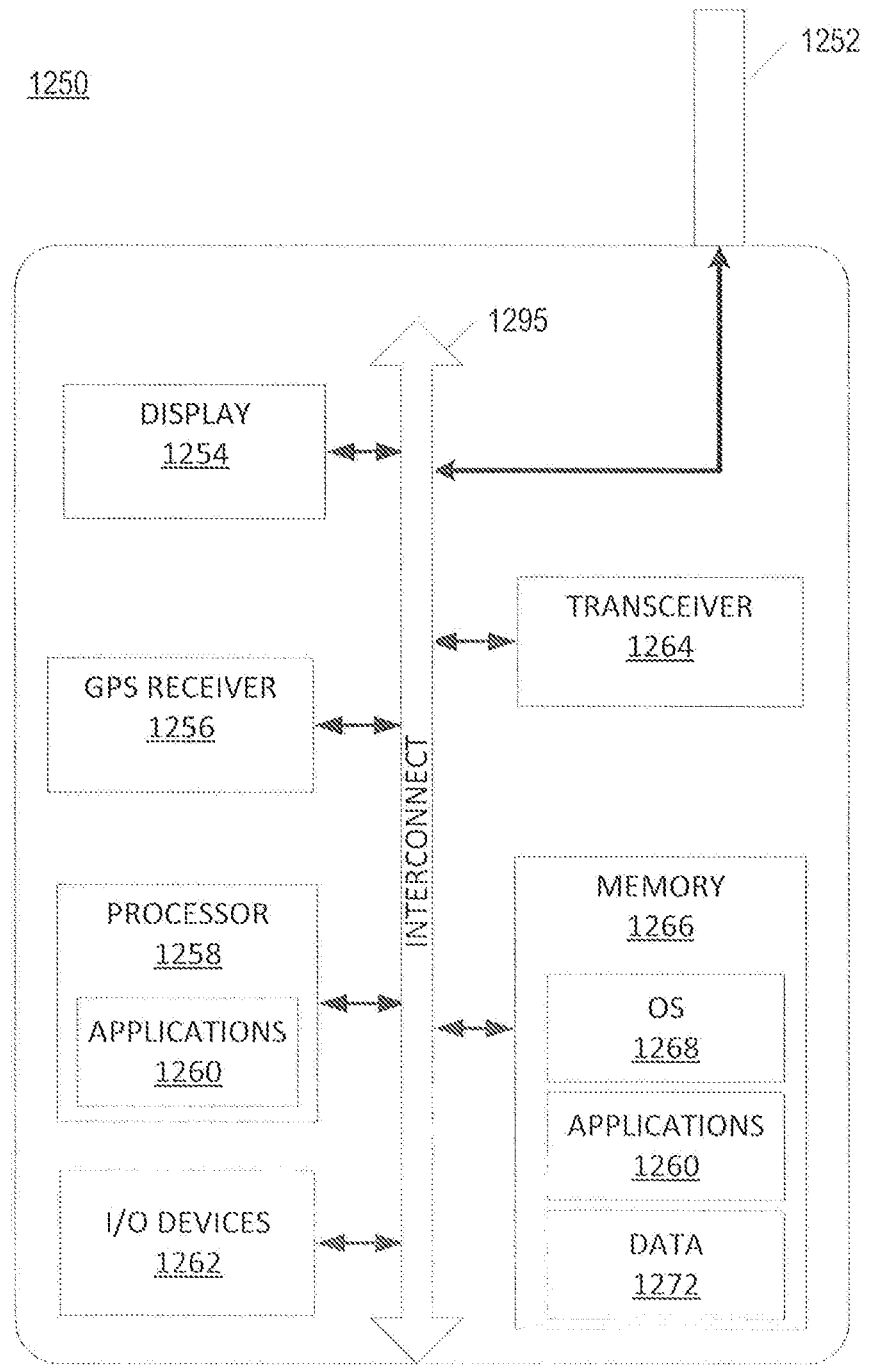
FIG. 12A is a block diagram illustrating a mobile device, according to an example embodiment.

FIG. 12A is a block diagram illustrating a mobile device 1250, according to an example embodiment. The mobile device 1250 may be a device described herein such as (e.g., device 142, 144, 146). The mobile device 1250 may include a processor 1258. The processor 1258 may be any of a variety of different types of commercially available processors suitable for mobile devices (for example, an XScale architecture microprocessor, a Microprocessor without Interlocked Pipeline Stages (MIPS) architecture processor, or another type of processor). The processor 1258 may include application(s) 1260. The application(s) 1260 may be partially or wholly hardwired as part of the processor 1258. A memory 1266, such as a Random Access Memory (RAM), a Flash memory, or other type of memory, is typically accessible to the processor. In an example embodiment, the memory 1266 may partially be ROM. The memory 1266 may be adapted to store an OS 1268, data 1272, as well as application(s) 1260. The application(s) 1260 may be partially or wholly hardwired and partially or wholly resident in the memory 1266. The application(s) 1260 may be an application such as a service 172, 174, 176 (see FIG. 3), which may be an application on the mobile device 1250. The data 1272 may include data such as data 708 (see FIG. 7) and communications mode 120. The processor 1258 may be coupled, either directly or via appropriate intermediary hardware, to a display 1254 and to one or more input/output (I/O) devices 1262, such as a keypad, a touch panel sensor, a microphone, and the like. Similarly, in some example embodiments, the processor 1258 may be coupled to a transceiver 1264 that interfaces with an antenna 1252. The transceiver 1264 may be configured to both transmit and receive cellular network signals, wireless data signals, or other types of signals via the antenna 1252, depending on the nature of the mobile device 1250. In this manner, the communications 132, 134, 136 (see FIG. 1) with the cloud 182, 184, 186 may be established. Further, in some configurations, a global positioning system (GPS) receiver 1256 may also make use of the antenna 1252 to receive GPS signals. Each of display 1254, transceiver 1264, GPS receiver 1256, processor 1258, memory 1266, I/O devices, and antenna 1252 may be connected to an interconnect 1295 and/or connected (not illustrated) to one or more of each other. The interconnect 1295 may be one or more communications systems such as a bus or other hardware to enable communication, which may even be each component individually wired to the other components the component communicates with.

Figure 12B:
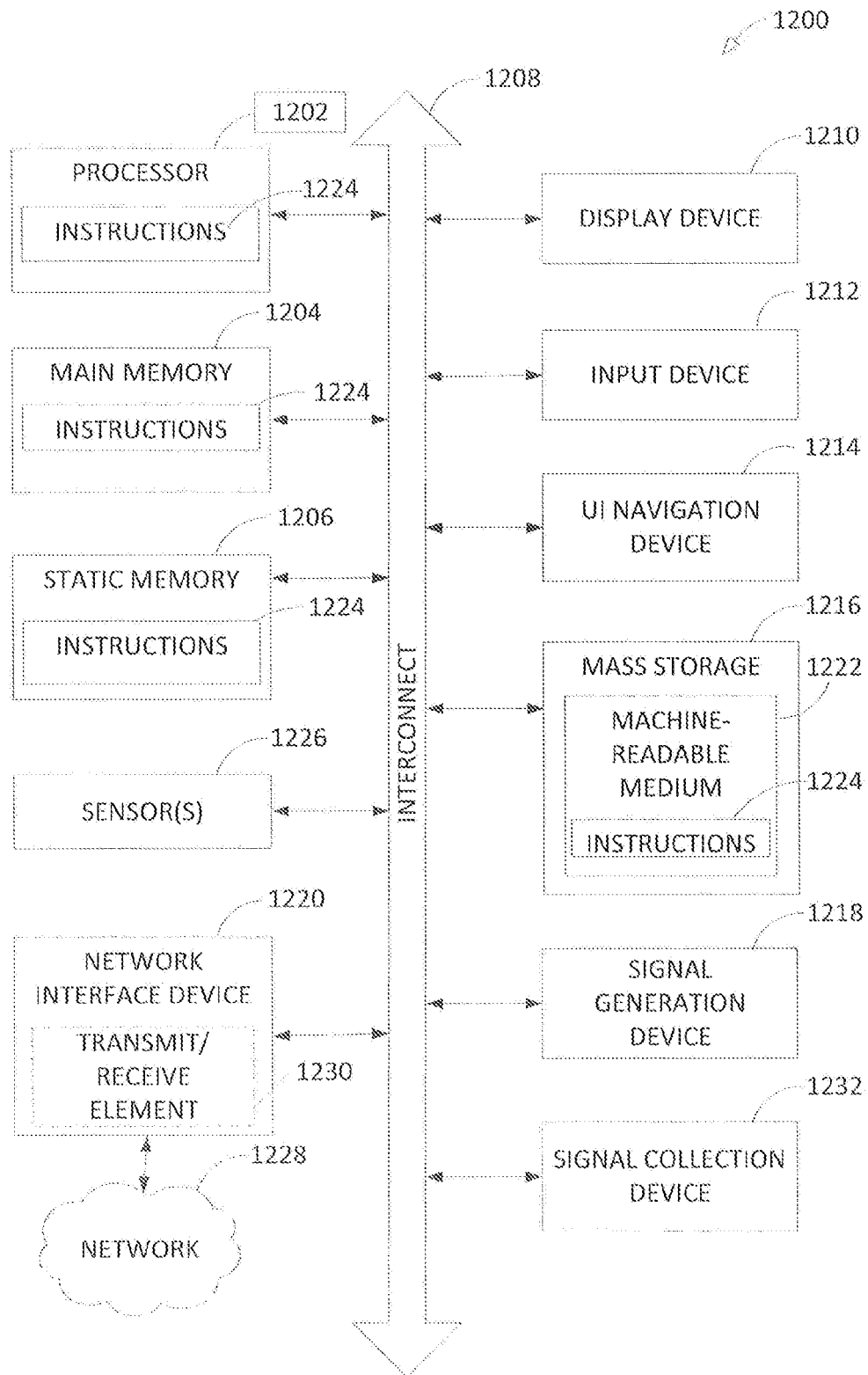
FIG. 12B is a block diagram of a machine or apparatus in the example form of a computer system within which instructions for causing the machine or apparatus to perform any one or more of the methods disclosed herein may be executed.

FIG. 12B is a block diagram of a machine or apparatus in the example form of a computer system 1200 within which instructions for causing the machine or apparatus to perform any one or more of the methods disclosed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a wearable device, a tablet PC, a set-top box (STB), a personal digital assistant (PDA), a cellular telephone, a web appliance, a network router, switch or bridge, an edge device, a gateway, a gateway, or another machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes one or more processors 1202 (e.g., a central processing unit (CPU), a graphics processing unit (GPU), or both), a main memory 1204 and a static memory 1206, which communicate with each other via a bus 1208. In example embodiments, the computer system 1200 includes a display unit 1210 (e.g., a liquid crystal display (LCD) or a cathode ray tube (CRT)). In example embodiments, the computer system 1200 also includes an alphanumeric input device 1212 (e.g., a keyboard), a user interface (UI) navigation device 1214 (e.g., a mouse), mass storage 1216, a signal generation device 1218 (e.g., a speaker), and a network interface device 1220. In example embodiments, the network interface device 1220 includes a transmit/receive element 1230. In example embodiments, the transmit/receive element 1230 is referred to as a transceiver. The transmit/receive element 1230 may be configured to transmit signals to, or receive signals from, other systems such as, referring to FIG. 1, first systems 142, second system 144, and third system 146. In example embodiments, the transmit/receive element 1230 may be an antenna configured to transmit and/or receive RF signals. In an example embodiment, the transmit/receive element 1230 may be an emitter/detector configured to transmit and/or receive IR, UV, or visible light signals, for example. In an example embodiment, the transmit/receive element 1230 may be configured to transmit and receive both RF and light signals. It will be appreciated that the transmit/receive element 1230 may be configured to transmit and/or receive any combination of wireless signals.

The mass storage 1216 includes a machine-readable medium 1222 on which is stored one or more sets of instructions and data structures (e.g., software) 1224 embodying or used by any one or more of the methods or functions described herein.

For example, the instructions 1224 may include application module 102, data 150, application framework 104, gateway engine module 106, gateway services 108, data adapters 110, and/or an implementation of any of the method steps described herein. The instructions 1224 may be modules. The instructions 1224 may also reside, completely or at least partially, within the main memory 1204, static memory 1206, and/or within the one or more processors 1202 during execution thereof by the computer system 1200, with the main memory 1204 and the one or more processors 1202 also constituting machine-readable media. The instructions 1224 may be implemented in a hardware module.

While the machine-readable medium 1222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and compact disk read only memory (CD-ROM) and digital video disc-read only memory (DVD-ROM) disks.

The instructions 1224 may further be transmitted or received over a communications network 1228 using a transmission medium. The instructions 1224 may be transmitted using the network interface device 1220 and any one of a number of well-known transfer protocols (e.g., hypertext mark-up protocol (HTTP)). Examples of communication networks include a local area network (LAN), a wide-area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

Certain example embodiments are described herein as including logic or a number of components, modules, applications, agents, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various example embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering example embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware nodules. In example embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other example embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

This written description uses examples to disclose some example embodiments, including the best mode, and also to enable any person skilled in the art to practice the disclosed embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gateway comprising:
memory to store data in a common data format to be operated on by a plurality of applications resident at the gateway;
a plurality of network interfaces, each network interface configured to interface at least one application to a remote device via a network;
a plurality of protocol adapters coupled to a corresponding network interface, each protocol adapter configured to communicate with the remote device using a communication protocol of the remote device;
a plurality of data adapters, each data adapter configured to convert data between a format of a corresponding remote device and the common data format;
a protocol selector module configured to select a protocol adapter of the plurality of protocol adapters, a selected protocol adapter corresponding to the remote device with which communication is to be established, the selecting of the protocol adapter based on a device configuration table, the device configuration table mapping protocol adapter data to a plurality of devices, the plurality of devices including the remote device;
a data adapter selector module configured to select a data adapter of the plurality of data adapters, a selected data adapter corresponding to the remote device with which communication is established using the selected protocol adapter, the selecting of the data adapter based on the device configuration table, the device configuration table mapping device adapter data to the plurality of devices; and
a service selector module configured to select an application module from the plurality of applications for processing of a communication that is to be received from the remote device, the selecting of the application module based on the device configuration table, the device configuration table mapping service data to the plurality of devices.

2. The gateway of claim 1, wherein the plurality of network interfaces includes a machine interface, a cloud interface, and a mobile interface.

3. The gateway of claim 1, wherein the protocol selector module is further configured to select a mobile protocol adapter to interface with a remote mobile device, a machine protocol adapter to interface with a remote machine, and a server protocol adapter to interface with a remote server, and wherein the data adapter selector module is further configured to select a mobile data adapter, machine data adapter, and server data adapter.

4. The gateway of claim 1, wherein the plurality of protocol adapters and the plurality of data adapters provide an abstraction between data domains defined by the plurality of remote devices and the plurality of applications.

5. The gateway of claim 1, further comprising an application configuration table comprising a plurality of application configurations and a services configuration table comprising a plurality of service configurations.

6. The gateway of claim 5, further comprising:
a gateway engine module configured to search via one or more of the plurality of network interfaces for a new remote device, to generate a new device configuration for the new remote device, and to report the new remote device to an application of the plurality of applications.

7. The gateway of claim 5, wherein the protocol selector module is further configured to determine a device configuration of the plurality of device configurations based on a network address of a received communication from the remote device, and configured to select the selected protocol adapter based on the device configuration of the remote device.

8. The gateway of claim 7, further comprising:
an application selector module configured to select an application module of a plurality of application modules based on the device configuration of the remote device, wherein the selected application module is configured to processes data included in the received communication.

9. The gateway of claim 7, wherein the data adapter selector module is further configured to select the selected data adapter using the device configuration of the remote device.

10. The gateway of claim 7, wherein the protocol selector module is further configured to group the received communication with previously received communications based on a group indication of the device configuration of the remote device.

11. The gateway of claim 10, wherein the remote device is a machine control device, and wherein an application of the plurality of applications is configured to control the machine control device based on user input from a mobile device via a mobile interface, and further configured to store data from the machine control device on a remote server via a cloud interface.

12. The gateway of claim 1, wherein the service selector module is further configured to receive a request to access a service from the remote device, to determine a device configuration of the plurality of device configurations based on a network address of a received request from the remote device, and to select the requested service from the plurality of services based on the plurality of service configurations and the device configuration.

13. The gateway of claim 1, wherein the selected data adapter module is further configured to convert the data between the format of the corresponding remote device and the common data format by using a first portion of the data in the format corresponding to the remote device to convert a second portion of the data in the format corresponding to the remote device, wherein the first portion of the data is metadata describing the second portion of the data.

14. The gateway of claim 1, further comprising:
an application frame module configured to provide an application programming interface (API) for accessing services provided by the gateway system to the plurality of applications.

15. A method comprising:
storing data in a common data format to be operated on by a plurality of applications;
providing a plurality of network interfaces, each network interface interfacing at least one application to a remote device via a network;
providing a plurality of protocol adapters coupled to a corresponding network interface, each protocol adapter communicating with the remote device using a communication protocol of the remote device;
providing a plurality of data adapters, each data adapter converting data between a format of a corresponding remote device and the common data format;
selecting a protocol adapter from a plurality of protocol adapters for a remote device with which communication is to be established, the selecting of the protocol adapter based on a device configuration table, the device configuration table mapping protocol adapter data to a plurality of devices, the plurality of devices including the remote device, selecting a data adapter of the plurality of data adapters using the selected protocol adapter, the selecting of the data adapter based on the device configuration table, the device configuration table mapping device adapter data to the plurality of devices; and
selecting an application module from a plurality of applications resident at a gateway for processing of a communication that is to be received from the remote device, the selecting of the application module based on the device configuration table, the device configuration table mapping service data to the plurality of devices.

* * * * *